UNITED STATES PATENT OFFICE.

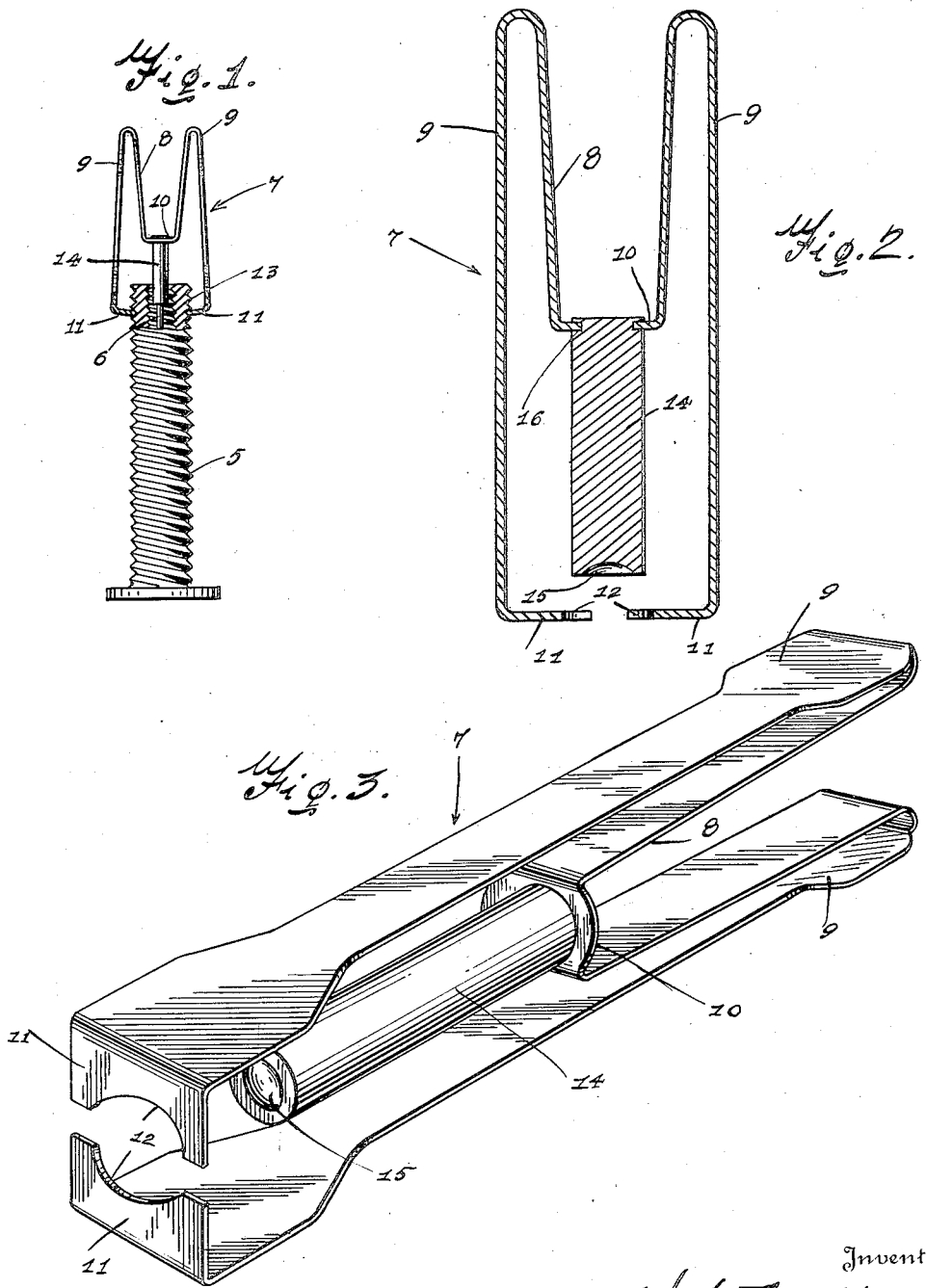

WILLIAM J. FAULKNER, OF RUSSELLVILLE, ARKANSAS.

DEFLATING-TOOL FOR TIRES.

1,126,743.   Specification of Letters Patent.   Patented Feb. 2, 1915.

Application filed August 31, 1914. Serial No. 859,499.

*To all whom it may concern:*

Be it known that I, WILLIAM J. FAULKNER, a citizen of the United States, residing at Russellville, in the county of Pope, State of Arkansas, have invented certain new and useful Improvements in Deflating-Tools for Tires; and I do hereby declare the following to be a full, clear, and exact description of the invention, such as will enable others skilled in the art to which it appertains to make and use the same.

This invention relates to tools, particularly a tool adapted for use in connection with pneumatic tires and has for its object the provision of a device adapted to be applied to the valve stem of a pneumatic tire for holding the plunger thereof depressed in order to accomplish the deflation of the tire.

An important object is the provision of a device of this character which when applied to a valve stem will grip the stem and remain thereon without being held by the operator.

Another object is the provision of a device of this character formed as a spring clip, the spring portion not only providing the necessary resilience but also terminating in the actual gripping jaws.

A further object is the provision of a device of this character which will be simple and inexpensive in manufacture, efficient and durable in use, and a general improvement of the art.

With these and other objects and advantages in view, the invention consists in the novel construction and arrangement of parts to be hereinafter more fully described and claimed, and illustrated in the accompanying drawing, in which—

Figure 1 is a side elevation of my device, applied to a valve, the stem being partly in section, Fig. 2 is a vertical sectional view through my device detached, and Fig. 3 is a perspective view.

Referring now more particularly to the drawing, the numeral 5 designates the usual valve stem of a pneumatic tire and 6 the plunger for the valve.

When it is desired to deflate the tire, it is necessary to press the plunger 6 inwardly, as is well known, this being usually done by employing a match stem or other similar article. The principal objection to this method however, is that the operator must remain in such position until the tire is entirely deflated and the task thereby rendered extremely inconvenient and annoying.

In detail, the device which is designated as a whole by the numeral 7, includes a single strip of resilient material, preferably sheet steel, that is bent first into substantially U-shaped form, as shown at 8, with the arms thereof then returned upon themselves as at 9 and extended downwardly beyond the bight 10 of the U. The terminals of these arms are then directed inwardly toward each other, as at 11, and have their adjacent edges concaved as at 12, thereby providing a pair of gripping jaws between which the stem 5 of the valve is adapted to be received, said concaved portions conforming to and engaging the threads 13 of the stem to retain the device securely in position.

It will be noted that because of the resilient nature of that portion of the article above-described and the manner in which it is formed the jaws 12 thereof are normally disposed in gripping position, it being necessary to press the looped portions 9 together to effect the spreading of the jaws.

In order to provide means for engagement with the plunger 6, I provide a post or pin 14 which is concaved as shown at 15, at the end, adapted to engage the plunger. The other end of the pin 14 is reduced as shown at 16, and extends through a suitable opening in the bight 10 of the device, it being flattened out after passing through said opening to prevent it from withdrawal.

My device is applied to the stem 5 by pressing the looped portions 9 together, thereby separating the jaws 12. The device is then slipped onto the stem 5 as far as possible, whereupon the plunger 6 will be moved inwardly by the pin 14. When the operator releases his pressure upon the looped portions 9, the curved jaws 12 will spring inwardly to grip the threads of the stem 5 and will consequently hold the device in position until removed by the operator, the pin 14 holding the plunger 6 in and thus allowing the deflation of the tire.

From the foregoing description and a study of the drawing it will be apparent that I have thus provided a simple and novel device whereby a valve plunger of a pneumatic tire may be depressed to permit of the deflation of the tire without requiring that the operator hold the plunger down.

It will be readily understood that I reserve the right to make various changes in the form, construction and arrangement of parts without departing from the spirit of the invention or limiting the scope of the subjoined claim.

What is claimed is:

A tire deflating tool including a single strip of resilient material that is bent first into substantially U-shaped form with the arms thereof then returned upon themselves and extended beyond the bight of the U, said arm terminating in a pair of gripping jaws for engaging the valve stem of a pneumatic tire, and a pin secured to the said bight portion and disposed between said arm for depressing the plunger of the valve.

In testimony whereof, I affix my signature, in the presence of two witnesses.

WILLIAM J. FAULKNER.

Witnesses:
  A. ELLIS,
  WILL D. VANCE.